United States Patent Office 3,646,115
Patented Feb. 29, 1972

3,646,115
PRODUCTION OF UNSATURATED ESTERS USING COMPLEXED CATALYSTS
Leon Starr, Plainfield, N.J., assignor to Mobil Oil Corporation
No Drawing. Filed Sept. 13, 1967, Ser. No. 667,379
Int. Cl. C07c 67/04
U.S. Cl. 260—497                      5 Claims

ABSTRACT OF THE DISCLOSURE

Unsaturated esters are prepared by reacting an olefin with a monocarboxylic acid and oxygen in the presence of a complexed catalyst. The catalyst comprises a halide of Rh or Ir wherein the metal has a valence lower than maximum, complexed with carbon monoxide or trihydrocarbyl phosphines, arsines, or stibines or mixtures thereof. The unsaturated esters have many known uses, such as in preparing homopolymers and copolymers with other vinyl compounds in the coating field.

BACKGROUND OF THE INVENTION

Field of the invention

This application relates to the preparation of unsaturated esters. It is more particularly concerned with the preparation of unsaturated esters of monocarboxylic acids with olefins.

Description of the prior art

As is well known to those familiar with the art, several processes have been proposed to prepare unsaturated esters, such as vinyl acetate, by reacting an olefin, a monocarboxylic acid, and oxygen in the presence of noble metal catalysts, such as $PdCl_2$. In order to achieve suitably long run times, however, cooxidants, such as cupric ions, quinones, and electric current together with oxygen are required. These cooxidants act to reoxidize the catalytic metal, e.g., Pd(O) to Pd(II), during the course of the reaction. Such systems as the palladium/copper system usually have the disadvantage that, as exemplified by vinyl acetate, significant amounts of acetaldehyde and ethylidine diacetate are produced as by-products. The desideratum is a catalyst system that has greater selectivity for the production of the unsaturated ester.

SUMMARY OF THE INVENTION

It is the discovery of this invention that unsaturated esters can be produced with a high degree of selectivity, when using a complexed noble metal halide catalyst and in the absence of a cooxidant.

Accordingly, this invention comprises a method for producing an unsaturated ester that comprises contacting an olefin, a monocarboxylic acid, and oxygen with a catalyst complex comprising a halide of Rh or Ir in a valence state lower than maximum and carbon monoxide or a trihydrocarbyl phosphine, arsine, or stibine, or mixtures thereof.

DESCRIPTION OF SPECIFIC EMBODIMENTS

In accordance with this invention, an olefin, an organic acid, and oxygen are reacted in the presence of a catalyst complex, as hereinafter described, as illustrated by the following equation:

$$RCH=CH_2 + R'COOH + 1/2O_2$$
$$R'COOCH=CHR + H_2O,$$

wherein R and R' are alkyl ($C_1$–$C_4$) or hydrogen.

The olefin is a 1-olefin ($C_2$–$C_6$). When the substituent R is alkyl, it can be straight chain or branched chain. Typical examples of the olefins are ethylene; propylene; butene-1; isobutylene; pentene-1; 2-methylbutene-1; hexene-1; 2,3-dimethylbutene-1; 3,3-dimethylbutene-1; and 3-methylpentene-1.

The acid reactant is an alkanoic acid ($C_1$–$C_5$). When the R' substituent in the acid reactant is alkyl, it also can be straight chain or branched chain. Non-limiting examples of the organic acid reactant are formic acid, acetic acid, propionic acid, butyric acid, isobutyric acid, valeric acid, and isovaleric acid. The organic acid reactant is used in large excess, because it functions both as a reactant and as a diluent.

The oxygen reactant can be substantially pure oxygen or it can be a molecular oxygen-containing mixture, such as air and mixtures of oxygen and nitrogen or of air and oxygen. The molar ratio of olefin to oxygen can vary from about 2:1 to about 1:3, but preferably is about 1:2.5.

The catalyst used in the process of this invention is a complex of a rhodium or iridium halide (Cl, Br, or I) wherein the valence of the metal is lower than the maximum with a ligand, i.e., a trihydrocarbyl phosphine, arsine, or stibine. The complexed catalyst can also contain carbonyl. In its active form, the catalyst complex will contain the rhodium or iridium in a valence state lower than its maximum.

The preferred ligands in the catalyst complex are trihydrocarbyl phosphines, but trihydocarbyl arsines and stibines can be used. Carbon monoxide is also a suitable ligand. "Hydrocarbyl," as used in the specification and claims, indicates any acyclic or cyclic (alicyclic or aromatic) radical. The three hydrocarbyl groups attached to phosphorous, arsenic, or antimony in the ligand can be the same or different groups. Typical ligands are carbon monoxide, trimethylphosphine, triethylphosphine, tri-n-butylphosphine, triamylphosphines, trihexylphosphines, tripropylphosphine, trinonylphosphines, tridecylphosphines, di-n-butyl octadecylphosphine, triethylhexylphosphine, dimethylethylphosphine, triphenylphosphine, tris (dimethylphenyl) phosphine, ethyl-bis ($\beta$-phenylethyl) phosphine, tricyclopentylphosphine, tricyclohexylphosphine, dimethylcyclopentylphosphine, dicyclohexylmethylphosphine, phenyldiethylphosphine, dicyclohexylphenylphosphine, diphenylmethylphosphine, diphenylbutylphosphine, diphenylbenzylphosphine, trilaurylphosphine, and arsines and stibines substituted as in the foregoing, i.e., trimethylarsine, trimethylstibine, triethylarsine, triethylstibine, etc.

The catalyst complex is used in catalytic quantities. In general, a catalyst complex concentration will be between about 0.0001 weight percent and about weight 5 percent, based upon the weight of the monocarboxylic acid reactant, and preferably between about 0.0001 weight percent and about 1.0 weight percent.

It is generally preferred to carry out the process in the presence of mixtures of salts that contain halide radicals and radicals of the acid reactant. Suitably, the halide radical is supplied by an alkali metal or alkaline earth metal halide, such as lithium chloride, sodium chloride, potassium bromide, sodium iodide, and calcium chloride. Radicals of the acid reactant are supplied by alkali or alkaline earth metal salts of the aforedescribed acid reactants.

In the process of this invention, the reaction temperature can be between about 50° C. and about 180° C., preferably between about 100° C. and about 125° C. The pressure can range from atmospheric to about 800 p.s.i.g., preferably between about 300 p.s.i.g. and about 500 p.s.i.g.

This process can be operated in a batch, semi-continuous, or continuous manner. A suitable manner for effecting the reaction is to establish a liquid medium comprising monocarboxylic acid reactant, e.g. acetic acid, and catalyst complex. Under the selected operating conditions, the olefin, e.g. ethylene, and oxygen can be passed together or in separate streams into the liquid medium. The olefinic ester product and water can be continuously removed from the reaction zone, followed by product recovery by conventional procedures well known in the art.

EXAMPLE 1

A solution of 2.0 g. of lithium chloride, 7.0 g. lithium acetate, and 6.0 g. of tris-(triphenylphosphine) rhodium (III) trichloride in 100 cc. of glacial acetic acid was placed in a glass reactor and the solution was heated to 120° C. Then, 100 cc./min. ethylene and 50 cc./min. oxygen were bubbled through the reaction mixture at atmospheric pressure. A 1% conversion of ethylene charged was maintained for 40 hours with a 95% selectivity to vinyl acetate.

EXAMPLE 2

A one-liter stainless steel stirred autoclave was charged with 2.0 g. of lithium chloride, 7.0 g. of lithium acetate, 6.0 g. of tris(triphenylphosphine) rhodium (III) trichloride, and 350 g. of glacial acetic acid. The reaction mixture was heated to 120° C. Then, 280 p.s.i.g. of oxygen and 120 p.s.i.g. of ethylene were charged to the autoclave. The total pressure in the autoclave was maintained at 400–450 p.s.i.g. by periodic repressuring with oxygen/ethylene mixture. After 5 hours reaction time, 4.8 g. of vinyl acetate and 1.2 g. of acetaldehyde were obtained.

EXAMPLE 3

A run was carried out as described in Example 2, except that the catalyst complex was carbonyl bis(triphenylphosphine) rhodium (I) chloride. There were obtained 1.7 g. of vinyl acetate and 0.7 g. of acetaldehyde.

EXAMPLE 4

For comparison purposes, a run was carried out as described in Example 2, except that uncomplexed rhodium trichloride was used as the catalyst. There were obtained 0.84 g. of vinyl acetate and 0.62 g. of acetaldehyde.

EXAMPLE 5

A run was carried out as described in Example 2, except that the catalyst complex was carbonyl bis(triphenylphosphine) iridium (I) chloride. There was obtained 1.0 g. of vinyl acetate, but no acetaldehyde.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing an unsaturated ester that comprises contacting in the liquid phase a 1-olefinic hydrocarbon having 2–6 carbon atoms, an alkanoic acid having 1–5 carbon atoms, and oxygen with a catalyst complex consisting essentially of a chloride, bromide, or iodide, of rhodium or irridium, wherein the metal is in a valence state lower than the maximum, complexed with at least one ligand selected from the group consisting of carbon monoxide and trihydrocarbyl phosphines, arsines, and stibines, in the absence of a cooxidant, in the presence of an alkali metal salt of said alkanoic acid, at temperatures between about 50° C. and about 180° C., and at pressure between atmospheric and about 800 p.s.i.g.

2. The method of claim 1, wherein said 1-olefin is ethylene and said alkanoic acid is acetic acid.

3. The method of claim 2, wherein said catalyst is tris-triphenylphosphine rhodium (III) trichloride.

4. The method of claim 2, wherein said catalyst is carbonyl bistriphenylphosphine rhodium (I) chloride.

5. The method of claim 2, wherein said catalyst is carbonyl bistriphenylphosphine iridium (I) chloride.

References Cited

UNITED STATES PATENTS

| | | | |
|---|---|---|---|
| 3,190,912 | 6/1965 | Robinson | 260—497 |
| 3,221,045 | 11/1965 | McKeon et al. | 260—497 |
| 3,349,119 | 10/1967 | Fenton et al. | 260—497 |

FOREIGN PATENTS

| | | | |
|---|---|---|---|
| 615,596 | 9/1962 | Belgium | 260—497 |
| 1,221,224 | 7/1966 | Germany | 260—497 |

LORRAINE A. WEINBERGER, Primary Examiner

V. GORNER, Assistant Examiner

U.S. Cl. X.R.

260—604